United States Patent
Graceffo et al.

(10) Patent No.: US 11,349,569 B2
(45) Date of Patent: May 31, 2022

(54) METHODS AND APPARATUS FOR IMPLEMENTING AN OPTICAL TRANSCEIVER USING A VAPOR CELL

(71) Applicant: RAYTHEON COMPANY, Waltham, MA (US)

(72) Inventors: Gary M. Graceffo, Burke, VA (US); Andrew Kowalevicz, Arlington, VA (US); Benjamin P. Dolgin, Alexandria, VA (US)

(73) Assignee: RAYTHEON COMPANY, Waltham, MA (US)

(*) Notice: Subject to any disclaimer, the term of this patent is extended or adjusted under 35 U.S.C. 154(b) by 0 days.

(21) Appl. No.: 16/664,071

(22) Filed: Oct. 25, 2019

(65) Prior Publication Data

US 2020/0136727 A1   Apr. 30, 2020

Related U.S. Application Data

(60) Provisional application No. 62/750,911, filed on Oct. 26, 2018, provisional application No. 62/750,907, filed on Oct. 26, 2018.

(51) Int. Cl.
   *H04B 10/2575*   (2013.01)
   *H04B 10/40*     (2013.01)

(52) U.S. Cl.
   CPC ... *H04B 10/25753* (2013.01); *H04B 10/25759* (2013.01); *H04B 10/40* (2013.01)

(58) Field of Classification Search
   CPC ........ H04B 10/25753; H04B 10/25759; H04B 10/40; H04B 2210/006

USPC .............................. 398/115, 116; 372/55, 56
See application file for complete search history.

(56) References Cited

U.S. PATENT DOCUMENTS

| | | | |
|---|---|---|---|
| 4,172,663 | A | 10/1979 | Byer et al. |
| 4,417,964 | A | 11/1983 | Wolfrum et al. |
| 4,980,892 | A | 12/1990 | Cunningham et al. |
| 5,777,768 | A | 7/1998 | Korevaar |
| 5,896,005 | A | 4/1999 | Gurvitch et al. |
| 6,054,856 | A | 4/2000 | Garroway et al. |
| 6,868,237 | B2 | 3/2005 | Willebrand et al. |
| 9,018,575 | B2 | 4/2015 | Kowalevicz et al. |
| 9,165,963 | B2 | 10/2015 | Kowalevicz et al. |
| 9,171,219 | B2 | 10/2015 | Kowalevicz |
| 9,323,034 | B2 | 4/2016 | Dolgin |

(Continued)

OTHER PUBLICATIONS

Jiao et al.; Atom-based quantum receiver for amplitude and frequency modulated baseband signals in high frequency radio communication; Apr. 2018; State Key Laboratory of Quantum Optics and Quantum optics devices; pp. 1-5. (Year: 2018).*

(Continued)

*Primary Examiner* — Amritbir K Sandhu
(74) *Attorney, Agent, or Firm* — Lando & Anastasi, LLP

(57) ABSTRACT

A transmitter, receiver and transceiver system that may be used for both transmitting and receiving modulated signals are disclosed. The system includes an Electrical-to-Optical (E2O) converter that receives a Radio Frequency (RF) signal and transmits an optical signal and/or an Optical-to-Optical (O2O) that performs a wavelength translation from one wavelength to another wavelength. The Electrical-to-Optical (E2O) converter includes a vapor cell that converts the RF signal to an optical signal.

21 Claims, 5 Drawing Sheets

(56) References Cited

U.S. PATENT DOCUMENTS

| | | | |
|---|---|---|---|
| 9,400,414 B2 | 7/2016 | Kowalevicz | |
| 9,451,185 B2 | 9/2016 | Dolgin et al. | |
| 9,503,660 B2 | 11/2016 | Kowalevicz et al. | |
| 9,535,245 B1 | 1/2017 | Kowalevicz | |
| 9,538,096 B2 | 1/2017 | Dolgin | |
| 9,548,155 B2 | 1/2017 | Andersson et al. | |
| 9,887,779 B2 | 2/2018 | Kowalevicz | |
| 9,973,281 B2 | 5/2018 | Kowalevicz et al. | |
| 10,164,765 B2 | 12/2018 | Dolgin et al. | |
| 10,177,856 B2 | 1/2019 | Kowalevicz et al. | |
| 10,205,526 B2 | 2/2019 | Kowalevicz | |
| 10,225,020 B2 | 3/2019 | Dolgin et al. | |
| 10,243,670 B2 | 3/2019 | Kowalevicz et al. | |
| 10,243,673 B2 | 3/2019 | Dolgin et al. | |
| 10,250,292 B2 | 4/2019 | Graceffo et al. | |
| 10,256,917 B2 | 4/2019 | Dolgin et al. | |
| 10,274,549 B1* | 4/2019 | Ledbetter | G01R 33/26 |
| 10,305,602 B2 | 5/2019 | Dolgin et al. | |
| 10,313,022 B2 | 6/2019 | Dolgin et al. | |
| 10,340,965 B2 | 7/2019 | Dolgin et al. | |
| 10,374,743 B2 | 8/2019 | Dolgin et al. | |
| 10,378,880 B2 | 8/2019 | Dolgin et al. | |
| 10,498,464 B2 | 12/2019 | Graceffo et al. | |
| 10,509,065 B1* | 12/2019 | Shaffer | G01R 29/10 |
| 10,530,494 B2 | 1/2020 | Dolgin et al. | |
| 10,554,306 B1 | 2/2020 | Graceffo et al. | |
| 10,571,774 B2 | 2/2020 | Graceffo et al. | |
| 10,637,580 B2 | 4/2020 | Dolgin et al. | |
| 10,686,533 B2 | 6/2020 | Dolgin et al. | |
| 10,714,251 B2 | 7/2020 | Dolgin et al. | |
| 10,763,966 B1* | 9/2020 | Deb | H04B 10/25759 |
| 10,802,066 B1* | 10/2020 | Keaveney | G01R 29/10 |
| 10,826,603 B1 | 11/2020 | Kowalevicz et al. | |
| 10,924,189 B2 | 2/2021 | Kowalevicz et al. | |
| 11,012,160 B2 | 5/2021 | Kowalevicz et al. | |
| 11,101,896 B2 | 8/2021 | Kowalevicz et al. | |
| 11,133,873 B1 | 9/2021 | Kowalevicz et al. | |
| 11,159,244 B2 | 10/2021 | Graceffo et al. | |
| 11,159,245 B2 | 10/2021 | Kowalevicz et al. | |
| 2002/0030439 A1 | 3/2002 | Gurvitch et al. | |
| 2004/0013437 A1 | 1/2004 | Wiltsey et al. | |
| 2004/0080832 A1 | 4/2004 | Singh | |
| 2004/0080834 A1 | 4/2004 | Thompson | |
| 2005/0014472 A1* | 1/2005 | Cox | H04B 10/2575 455/82 |
| 2006/0159135 A1 | 7/2006 | Cliche et al. | |
| 2006/0182154 A1 | 8/2006 | Tanaka et al. | |
| 2009/0256638 A1* | 10/2009 | Rosenbluh | H03L 7/26 331/3 |
| 2010/0026394 A1* | 2/2010 | Davis | G04F 5/14 331/3 |
| 2010/0253948 A1 | 10/2010 | Strandjord et al. | |
| 2011/0242290 A1 | 10/2011 | Arai | |
| 2012/0147361 A1 | 6/2012 | Mochizuki et al. | |
| 2012/0154542 A1 | 6/2012 | Katz et al. | |
| 2013/0003766 A1* | 1/2013 | Savchenkov | G04F 5/14 372/38.01 |
| 2013/0099140 A1 | 4/2013 | Nakarai et al. | |
| 2013/0126755 A1 | 5/2013 | Kemnitz | |
| 2013/0328557 A1* | 12/2013 | Larsen | G01C 19/62 324/304 |
| 2014/0321487 A1* | 10/2014 | Wilkinson | H01S 3/1303 372/32 |
| 2014/0354275 A1* | 12/2014 | Sheng | G01R 33/26 324/244.1 |
| 2015/0015251 A1* | 1/2015 | Bulatowicz | G01R 33/26 324/304 |
| 2016/0043794 A1 | 2/2016 | Ashrafi et al. | |
| 2016/0064894 A1 | 3/2016 | Takiguchi et al. | |
| 2016/0349284 A1 | 12/2016 | Pradhan et al. | |
| 2016/0363617 A1* | 12/2016 | Anderson | G01R 29/0885 |
| 2017/0315054 A1* | 11/2017 | Lukens | G01J 3/26 |
| 2018/0019807 A1 | 1/2018 | Hreha et al. | |
| 2018/0292474 A1* | 10/2018 | Raz | G01R 33/26 |
| 2019/0187198 A1* | 6/2019 | Anderson | G01R 29/0878 |
| 2019/0208183 A1 | 7/2019 | Schmidt et al. | |
| 2019/0267772 A1* | 8/2019 | Fritsche | H01S 5/068 |
| 2019/0295264 A1 | 9/2019 | Petilli | |
| 2019/0331941 A1 | 10/2019 | Coolbaugh et al. | |
| 2020/0096504 A1 | 3/2020 | Kawata et al. | |
| 2020/0136727 A1* | 4/2020 | Graceffo | H04B 10/25753 |
| 2020/0292606 A1* | 9/2020 | Holloway | G01R 29/0885 |
| 2020/0295838 A1* | 9/2020 | Gordon | H04B 10/548 |
| 2020/0371328 A1 | 11/2020 | Kowalevicz et al. | |
| 2020/0403709 A1 | 12/2020 | Graceffo et al. | |
| 2020/0409189 A1 | 12/2020 | Graceffo et al. | |
| 2021/0006336 A1 | 1/2021 | Kowalevicz et al. | |
| 2021/0021351 A1 | 1/2021 | Kowalevicz et al. | |
| 2021/0021449 A1 | 1/2021 | Graceffo et al. | |
| 2021/0021775 A1 | 1/2021 | Lee | |
| 2021/0041515 A1 | 2/2021 | Dolgin | |
| 2021/0099232 A1 | 4/2021 | Graceffo et al. | |
| 2021/0099234 A1 | 4/2021 | Graceffo et al. | |
| 2021/0105073 A1 | 4/2021 | Graceffo et al. | |
| 2021/0126715 A1 | 4/2021 | Graceffo et al. | |
| 2021/0314071 A1 | 10/2021 | Graceffo et al. | |

OTHER PUBLICATIONS

Holloway et al; Development and Applications of a Fiber-coupled Atom-based Electric filed probe; Aug. 2018; International Symposium and Electromagnetic Compatibility; pp. 381-385 (Year: 2018).*

Jiao et al.; Atom-based quantum receiver for amplitude modulated and frequency modulated baseband signals in high frequency radio communication; Apr. 2018; State key laboratory of Quantum optics and quantum optics devices; pp. 1-5. (Year: 2018).*

Deb et al; Radio-over-fiber using an optical antenna based on Rydberg states of atoms; May 2018; Center for quantum science; University of Otago; pp. 1-5. (Year: 2018).*

Holloway et al; Development and Applications of a fiber couples Atom based Electric field probe; Aug. 2018; International Symposium and Electromagnetic Compatibility; pp. 381-385. (Year: 2018).*

Gordon et al.; Weak electric-field detection with sub-1 Hz resolution at radio frequencies using a Rydberg atom based receiver; Apr. 2019; AIP Advances; pp. 1-6. (Year: 2019).*

Ball, D.W., "Field Guide to Spectroscopy," SPIE Press, Bellingham, WA (2006), https://spie.org/publications/fg08_p13_i ndex_of_refraction?SSO= 1.

* cited by examiner

METHODS AND APPARATUS FOR IMPLEMENTING AN OPTICAL TRANSCEIVER USING A VAPOR CELL

CROSS-REFERENCE TO RELATED APPLICATIONS

This application claims the benefit under 35 U.S.C. § 119(e) of U.S. Provisional Application No. 62/750,907 filed on Oct. 26, 2018 and titled "METHODS AND APPARATUS FOR IMPLEMENTING AN OPTICAL TRANSCEIVER USING A VAPOR CELL," and also claims the benefit under 35 U.S.C. § 119(e) of U.S. Provisional Application No. 62/750,911 filed on Oct. 26, 2018 and titled "METHODS AND APPARATUS FOR IMPLEMENTING AN OPTICAL TRANSMITTER USING A VAPOR CELL," each of which is hereby incorporated by reference in its entirety for all purposes.

BACKGROUND

Radio antennas are commonly constructed from wire or other conductive elements that are resonant with the signal to be received or transmitted. When receiving, antennas convert an electromagnetic signal to an induced current in the antenna element. When transmitting, the antenna converts an internal current to an electromagnetic signal. This is known as reciprocity and is fully explained by Maxwell's equations.

Conventional optical intensity modulator technology is nonlinear by virtue of the techniques used. Typical modulators are composed of electro-optic material and a traveling wave electrode structure. This technique, due to the sinusoidal transfer function, is non-linear by nature. Linearization techniques, such as pre-compensation of the drive signal have been implemented with limited success. Conventional modulators introduce frequency spurs into the optical spectrum. The addition of spurs is undesirable because it wastes energy and can creates interference. There is a need for spur-free intensity modulators. In addition, there is a need to reduce the size and complexity of optical transmitters.

SUMMARY OF INVENTION

Aspects and embodiments are directed to transmitting, receiving, and transceiver systems that work on a fundamentally different principal than radio antennas, and instead are based on quantum mechanics based devices. In particular, transmitting, receiving, and transceiver systems that include a vapor cell. Aspects and embodiments are directed to optical transceiver technology that may be used for both transmitting and receiving intensity modulation (IM), frequency modulation (FM) and phase modulation (PM) signals. In some examples, the vapor comprises an Electrical-to-Optical (E2O) converter that receives an electromagnetic signal and converts the electromagnetic signal to a modulated optical signal. The vapor cell may also comprise an Optical-to-Optical (O2O) converter that performs a wavelength translation from one wavelength to another wavelength. The vapor cell converts the RF signal to an optical signal. The vapor cell can be used for either or for both of transmitting an optical signal and receiving an electromagnetic signal. One advantage of a vapor cell is that when intensity modulating an optical signal, it reduces the out of band spurs. In addition, for all modulation types, it simplifies the optical system by combining the functions of both the receiver and transmitter into a single integrated device.

One embodiment is directed to an optical transmitter. The optical transmitter includes a probe optical source configured to provide a first optical signal, an electromagnetic source configured to provide a modulated electromagnetic signal, and a vapor cell configured to receive the first optical signal and the modulated electromagnetic signal. The vapor cell is configured to modulate the first optical signal based on the received modulated electromagnetic signal to provide a modulated output optical signal. An intensity modulation of the modulated output optical signal is representative of a modulation of the modulated electromagnetic signal.

In one example, the optical transmitter includes launching optics configured to receive the modulated output optical signal and transmit the modulated optical signal.

In one example, the vapor cell comprises an Electrical-to-Optical (E2O) converter converts an electromagnetic signal to an optical signal.

In one example, the vapor cell comprises an Optical-to-Optical (O2O) converter that performs a wavelength translation from one wavelength to another wavelength.

In one example, wherein the vapor cell contains cesium atoms.

In one example, the optical transmitter further includes a second source of a second optical signal. With this arrangement, the vapor cell material may be opaque to a wavelength of first optical signal, and the second optical signal is provided at a wavelength of light to the vapor cell to excite atoms in the vapor cell to a high principal quantum number creating a superposition of two coupled degenerative states and a dark state that is resonant with the wavelength of the first optical signal to induce electromagnetically Induced Transparency (EIT) so as to make the vapor cell transparent to the wavelength of the first optical signal. With this arrangement, the highly excited electrons of the vapor cell respond to modulation variations in the electromagnetic field, which results in a change of the transmissivity of the dark state of the vapor cell thereby causing an intensity of first optical signal to be modulated as it propagates through the vapor cell.

With this arrangement, the vapor cell modulates the output optical signal with the modulation of the modulated electromagnetic signal, which can be any of intensity modulation (IM), frequency modulation (FM) and phase modulation (PM).

According to one embodiment, a transceiver device includes an optical transmitter that includes a probe optical source configured to provide a first optical signal, an electromagnetic source configured to provide a modulated electromagnetic signal, and a vapor cell configured to receive the first optical signal and the modulated electromagnetic signal. The vapor cell is configured to modulate the first optical signal based on the received modulated electromagnetic signal to provide a modulated output optical signal. An intensity modulation of the modulated output optical signal is representative of a modulation of the modulated electromagnetic signal.

In one example, the transceiver device also includes an optical Transmit/Receive (T/R) switch that routes the modulated output optical signal to one of a first output and a second output. The optical transceiver device further comprises an optical amplifier coupled to the first output of the optical T/R switch that amplifies the modulated output optical signal to an increased power level and provides as an amplified modulated optical signal to the launching optics. In one example, the launching optics are free space launching optics that receive the amplified modulated optical signal and launch the amplified modulated optical signal into free space.

In one example, the transceiver device also includes an optical detector coupled to the second output of the T/R switch. The optical detector receives the modulated output optical signal and provides a detected signal for processing. In one example, the transceiver device is coupled to and/or includes a processor that receives the detected signal and processes the detected signal to recover the modulated data from the signal.

One embodiment is directed to a method of transmitting a modulated optical signal. The method comprises providing a first optical signal at a first wavelength, providing a modulated electromagnetic signal, and modulating the first optical signal by vapor cell that receives the first optical signal and the modulated electromagnetic signal. The vapor cell modulates the first optical signal based on the received modulated electromagnetic signal to provide a modulated output optical signal, where an intensity modulation of the modulated output optical signal is representative of a modulation of the modulated electromagnetic signal.

In one example, the modulated output optical signal is launched into free space.

In one example, the method further comprises the vapor cell providing an Electrical-to-Optical (E2O) conversion.

In one example, the method further comprises the vapor cell providing an Optical-to-Optical (O2O) conversion.

In one example, the method further comprises providing the vapor cell with cesium atoms.

In one example, the method further comprises providing a second optical signal to the vapor cell at a wavelength of light to excite atoms in the vapor cell to a high principal quantum number creating a superposition of two coupled degenerative states and a dark state that is resonant with the first wavelength to induce electromagnetically Induced Transparency (EIT) so as to make the vapor cell transparent to the first wavelength of the first optical signal.

In one example, the method further comprises highly exciting electrons of the vapor cell so as to respond to modulation variations in the electromagnetic field, which results in a change of the transmissivity of the dark state of the vapor cell thereby causing an intensity of first optical signal to be modulated as it propagates through the vapor cell.

In one example, the method further comprises modulating the modulated electromagnetic signal with any of intensity modulation (IM), frequency modulation (FM) and phase modulation (PM).

In one example, the method further comprises amplifying the modulated output optical signal to an increased power level and providing as an amplified modulated optical signal.

In one example, the method further comprises detecting the modulated output optical signal and providing a detected signal based on the modulated output optical signal.

In one example, the method further comprises processing the detected signal to determine a modulation of the modulated electromagnetic signal.

One embodiment is directed to an electromagnetic receiver. The electromagnetic receiver includes a probe optical source configured to provide a first optical signal, a vapor cell configured to receive the first optical signal and a modulated electromagnetic signal and that provides a modulated optical signal. The electromagnetic receiver also includes an optical detector that receives the modulated output optical signal and provides a detected signal based on the modulated output optical signal. The vapor cell is configured to modulate the first optical signal based on the received modulated electromagnetic signal to provide a modulated output optical signal, wherein an intensity modulation of the modulated output optical signal is representative of a modulation of the modulated electromagnetic signal.

In one example, the optical receiver is coupled to and/or further comprises a processor that receives the detected signal and processes the detected signal to determine a modulation of the modulated electromagnetic signal.

In one example, the vapor cell comprises an Electrical-to-Optical (E2O) converter converts an electromagnetic signal to an optical signal.

In one example, the vapor cell comprises an Optical-to-Optical (O2O) converter that performs a wavelength translation from one wavelength to another wavelength.

In one example, the vapor cell contains cesium atoms.

In one example, the optical receiver further comprises a second source of a second optical signal. With this arrangement, the vapor cell material is opaque to a wavelength of first optical signal, and the second optical signal is provided at a wavelength of light to the vapor cell to excite atoms in the vapor cell to a high principal quantum number creating a superposition of two coupled degenerative states and a dark state that is resonant with the wavelength of the first optical signal to induce electromagnetically Induced Transparency (EIT) so as to make the vapor cell transparent to the wavelength of the first optical signal. With this arrangement, the highly excited electrons of the vapor cell respond to modulation variations in the electromagnetic field, which results in a change of the transmissivity of the dark state of the vapor cell thereby causing an intensity of first optical signal to be modulated as it propagates through the vapor cell.

With this arrangement, the modulation of the modulated electromagnetic signal can be any of intensity modulation (IM), frequency modulation (FM) and phase modulation (PM).

One embodiment includes a method of receiving a modulated electromagnetic signal. The method comprises providing a first optical signal at a first wavelength to vapor cell, receiving a modulated electromagnetic signal at vapor cell, and modulating the first optical signal based on the received modulated electromagnetic signal to provide a modulated output optical signal. With this arrangement, an intensity modulation of the modulated output optical is representative of a modulation of the modulated electromagnetic signal.

In one example, the method further includes detecting the modulated output optical signal and processing the detected signal to determine a modulation of the modulated electromagnetic signal.

In one example, the method further comprises the vapor cell providing an Electrical-to-Optical (E2O) conversion.

In one example, the method further comprises the vapor cell providing an Optical-to-Optical (O2O) conversion.

In one example, the method further includes further comprises providing the vapor cell with cesium atoms.

In one example, the method further includes providing a second optical signal to the vapor cell at a wavelength of light to excite atoms in the vapor cell to a high principal quantum number creating a superposition of two coupled degenerative states and a dark state that is resonant with the first wavelength to induce electromagnetically Induced Transparency (EIT) so as to make the vapor cell transparent to the first wavelength of the first optical signal. With this arrangement, electrons of the vapor cell are highly excited so as to respond to modulation variations in the electromagnetic field, which results in a change of the transmissivity of the dark state of the vapor cell thereby causing an intensity of first optical signal to be modulated as it propagates through the vapor cell.

In one example, the method further includes further comprises detecting the modulation of the modulated electromagnetic signal with any of intensity modulation (IM), frequency modulation (FM) and phase modulation (PM).

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Figure 1:
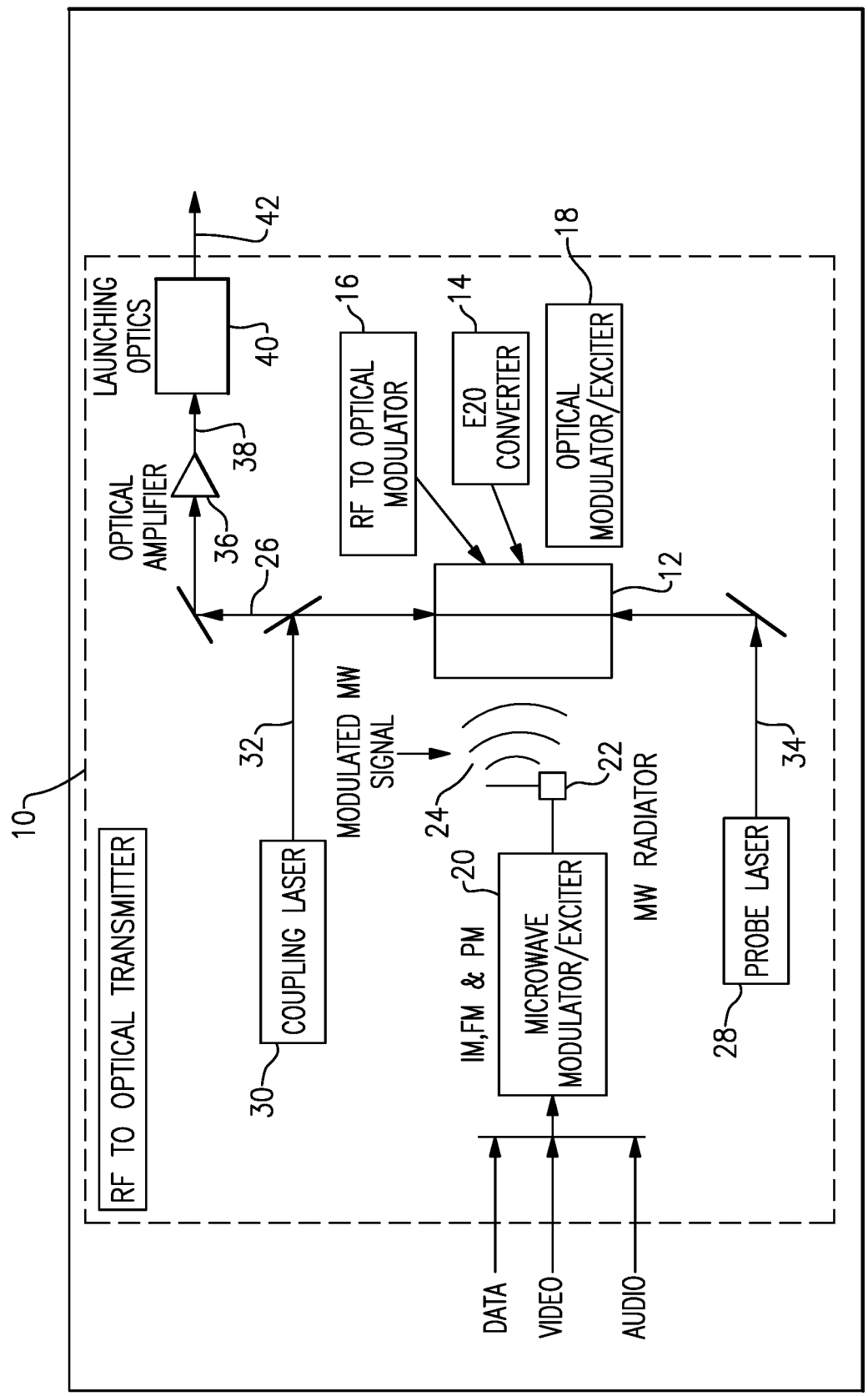
FIG. 1 illustrates one example of an optical transmitter using a vapor cell as an E2O converter for transmitting an optical signal.

Aspects and embodiments are directed to transmitting, receiving, and transceiver systems that work on a fundamentally different principal than radio antennas, and instead are based on quantum mechanics-based devices. In particular, transmitting, receiving, and transceiver systems that include a vapor cell. Aspects and embodiments are directed to optical transceiver technology that may be used for both transmitting and receiving intensity modulation (IM), frequency modulation (FM) and phase modulation (PM) signals. In some examples, the vapor comprises an Electrical-to-Optical (E2O) converter that receives an electromagnetic signal and converts the electromagnetic signal to a modulated optical signal. The vapor cell may also comprise an Optical-to-Optical (O2O) converter that performs a wavelength translation from one wavelength to another wavelength. The vapor cell converts the RF signal to an optical signal. The vapor cell can be used for either or for both of transmitting an optical signal and receiving an electromagnetic signal. One advantage of a vapor cell is that when intensity modulating an optical signal, it reduces the out of band spurs. In addition, for all modulation types, it simplifies the optical system by combining the functions of both the receiver and transmitter into a single integrated device.

The underlying principle is as follows: When a laser is shone on an opaque material, the photons emitted by the laser are absorbed by electrons of like energy levels in the opaque material. Since the photons are absorbed by the electrons, there are no photons available to exit the material; hence, making the material opaque. However, one phenomenon that is exploited by various aspects and embodiments disclosed herein is that if these electrons could be made unavailable to absorb the photons, then the material would become transparent at the wavelength(s) of the otherwise energy-absorbing electrons. Making an opaque material transparent to a particular wavelength of light or range of wavelengths of is achieved using a technique known as Electromagnetically Induced Transparency (EIT). EIT creates the superposition of two coupled degenerative quantum states, which results in a dark state. Two or more different states of a quantum mechanical system are said to be degenerate if they give the same value of energy upon measurement. A dark state is the state of an atom that cannot absorb or emit photons of a particular wavelength.

A second phenomenon that is exploited by various aspects and embodiments disclosed herein is that of Rydberg atoms. A Rydberg atom is an excited atom with one or more electrons that have a very high principal quantum number. Essentially, electrons in a Rydberg atom are further away from the nucleus of the atom than they are when the electrons are in their unexcited state. These electrons are still loosely bound to the nucleus.

According to various aspects and embodiments, both EIT and Rydberg atoms are used in the implementation of an Electrical-to-Optical (E2O) converter and/or an Optical-to-Optical (O2O) converter. These devices are made from a vapor cell. The E2O converter is a device that converts a Radio Frequency (RF) signal impinging on the vapor cell to an optical signal. The O2O converter is a device that performs a wavelength translation from one wavelength to another wavelength. Another phenomenon that is exploited by various aspects and embodiments is that if the impinging RF or optical signal exciting the vapor cell is modulated, then the modulation is transferred in the process.

According to certain various aspects and embodiments, the basic component of a transmitter, a receiver, or a transceiver is a vapor cell, functioning as either an E2O or O2O device. A system including the transmitter, receiver or transceiver also includes a probe laser and a coupling laser. In certain examples the vapor cell contains cesium atoms. However it is appreciated that other elements or compounds may be used in the vapor cell.

The vapor cell is typically opaque to the wavelength of the probe laser. The probe laser is the mechanism of transport through the vapor cell. According to certain various aspects and embodiments, a coupling laser is used to both excite the electrons of the cesium atoms to a high principal quantum number creating a superposition of two coupled degenerative states and a dark state. The dark state is resonant with the probe laser, allowing the probe laser to pass through the vapor cell. Thus, essentially in operation, when the coupling laser is turned off, the probe laser is highly attenuated in the vapor cell. However, when the coupling laser is turned on, the probe laser passes through the vapor cell.

Since the electrons in the vapor cell at a specific wavelength are highly excited, they are very sensitive to an impinging electromagnetic field at the Rabi frequency. Thus, the highly excited electrons act as tiny antennas. In addition, if the external electromagnetic field is modulated, for example with amplitude modulation, the electrons respond to the amplitude variations in the impinging electromagnetic field. As the electrons respond to the amplitude variations in the impinging electromagnetic field, they change the transmissivity of the dark state, thereby causing the intensity of the probe laser's signal to vary as it exits the vapor cell. This is known as the Autler Towns effect. The intensity modulation imparted on the probe laser is reflective of the amplitude modulation on the external electromagnetic field.

Thus, when an EIT state exists in a vapor cell and the electrons are properly excited, an external amplitude modulated radio signal or other modulated electromagnetic signal causes the probe laser to be intensity modulated with the same modulation as it passes through the cell. Thus, by directing the probe laser signal exiting the vapor cell onto a photodetector and measuring the output of the detector, the amplitude modulation of the incident electromagnetic signal can be detected. This same structure and technique can also be used to detect frequency and phase modulation.

FIG. 1 illustrates one example of a vapor cell-based modulator and optical transmitter 10. The optical transmitter includes a vapor cell 12 which comprises any or all of an E2O converter 14 that converts an electromagnetic signal to an optical signal, an RF to optical modulator 16 that modulates and optical signal based on a modulation of an RF signal, and an optical Modulator/Exciter 18 that provides a modulated optical signal. The optical transmitter 10 is contained within the boundaries of the dashed line box illustrated in FIG. 1

Referring to FIG. 1, the operation of the vapor cell in the optical transmitter 10 will now be described. A coupling laser 30 provides an output signal 32 that is configured in wavelength and energy to excite the electrons of the atoms in the Vapor Cell 12 to a high principal quantum number creating a superposition of two coupled degenerative states and thus a dark state in the vapor cell 12 at a certain wavelength or range of wavelengths. The dark state is configured to be at a wavelength or range of wavelengths that is resonant with a signal 34 output by the probe laser 28, thereby allowing the probe laser signal to pass through the vapor cell. Thus, when the coupling laser 30 is turned on, the probe laser signal passes through the vapor cell 12, and when the coupling laser 30 is turned off, the vapor cell returns to its natural state and the probe laser signal 34 is highly attenuated by the vapor cell 12.

When the coupling laser 30 signal 32 is coupled to the vapor cell 12, the electrons in the vapor cell at a certain selected wavelength or range of wavelengths corresponding to the coupling signal 32 become highly excited. The electrons in the vapor cell become very sensitive to the impinging electromagnetic field 24 provided by the microwave exciter 20. In addition, if the external electromagnetic field 24 is modulated, for example with amplitude modulation, the electrons in the vapor cell 12 respond to the amplitude variations in the impinging electromagnetic field 24. As the electrons respond to the amplitude variations in the impinging electromagnetic field, they change the transmissivity of the dark state of the vapor cell 12, thereby modulating the intensity of the probe laser signal 34 to vary as it transmits through the vapor cell 12. When an EIT state is created in the vapor cell 12 by coupling laser signal 32 and the electrons are properly excited, the amplitude modulated electromagnetic signal 24 (RF/microwave or other frequency or other form of modulated electromagnetic signal 24) causes the probe laser signal 34 to be intensity modulated with the same modulation as the modulated electromagnetic signal 24 as it passes through the vapor cell 12.

Thus, according to certain embodiments, the microwave modulator/exciter 20 is used to modulate electrically the optical data 26 signal to be transmitted by the RF to optical transmitter 10. The microwave exciter 20 transmits RF/microwave energy to the vapor cell 12 via an antenna 22 (or another form of coupling device), which couples the RF/microwave energy (signal) 24 to the vapor cell 12 comprising an E2O converter 14 at the appropriate resonant frequency and power level required to excite the electrons of the Rydberg atoms of the vapor cell 12. As has been discussed herein, the E2O converter 14 converts the electrically modulated RF/microwave energy signal to an optically modulated signal 26 provided at output of the vapor cell 12. The E2O converter modulates the probe laser signal 34. The modulated probe laser signal 26 can also be amplified by an optical amplifier 36 to an appropriate power level and provided as an amplified optical signal 38. Once amplified, a modulated optical signal 42 is launched into free space by the launching optics 40.

Thus, aspects and embodiments provide a system that transmits a modulated optical carrier signal 42. The optical carrier signal 42 can be amplitude modulated, frequency modulated, or phase modulated. A vapor cell 12 is used as an optical modulator and optical exciter 18. A coupling laser 30 establishes an energy state of the Rydberg atoms. The optical carrier signal 34 (provided by probe laser 28) is modulated in the vapor cell 12, by modulating the transmissivity of the dark state created by the EIT process. The modulated probe laser signal 26 is amplified by optical amplifier 36 to the appropriate power level for free space transmission as optical signal 42.

With this arrangement, the wavelength of the microwave exciter is at resonance with the excited state of the Rydberg atoms of the vapor cell. A power level of the RF/microwave signal determines a magnitude (a depth) of the modulation for IM modulation. With this arrangement, the amplitude modulation of the probe laser signal is linear. One advantage of this technique and arrangement is that it reduces the out of band spurs generated as compared to conventional technology for amplitude modulation. In addition, another advantage of this technique and arrangement is that it simplifies optical transmitter design by integrating both the modulator and exciter into a single integrated device.

Figure 2:
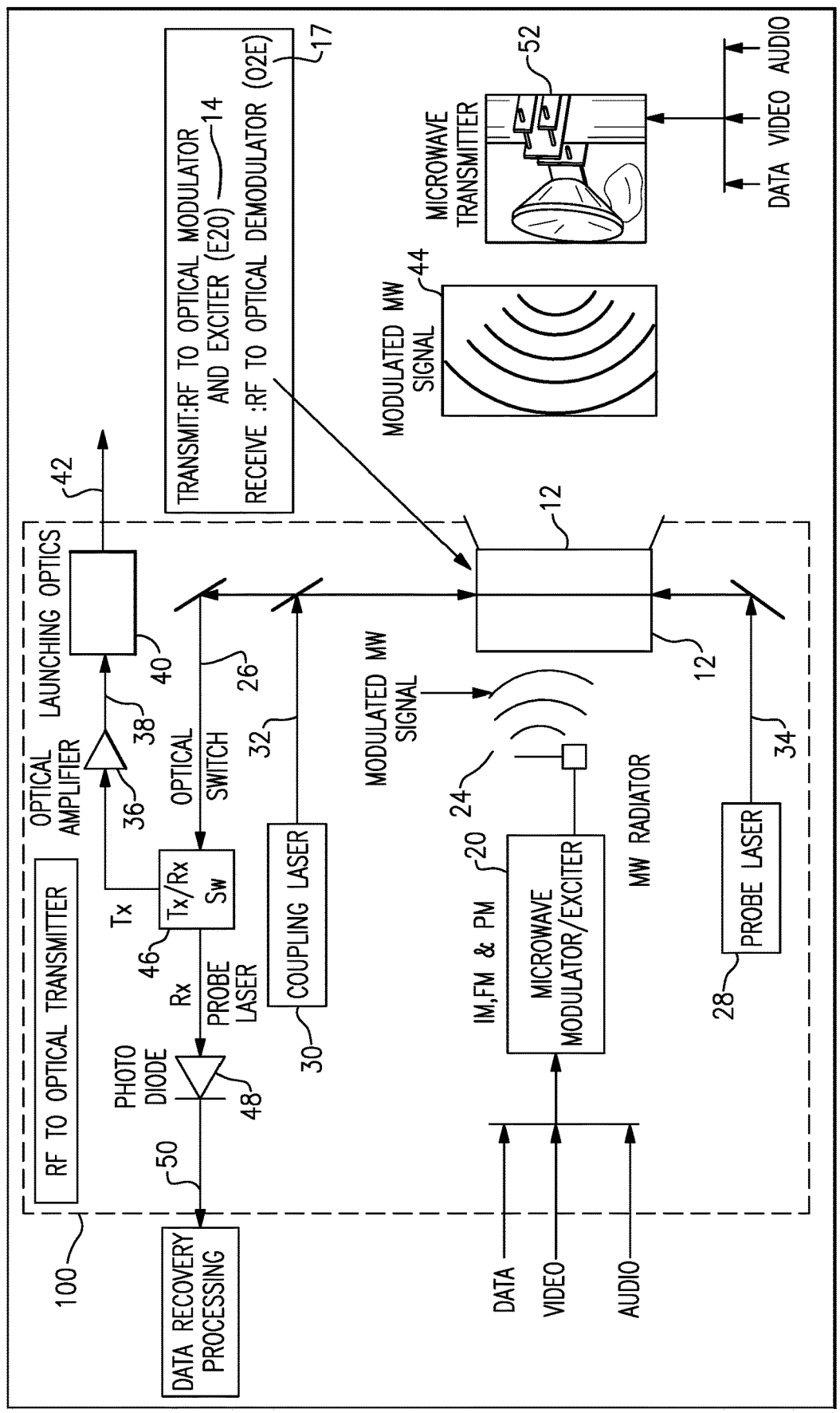
FIG. 2 illustrates one example of an optical transceiver using a vapor cell as an E2O converter for both transmitting an optical signal and receiving and electromagnetic signal.

FIG. 2 illustrates one example of an optical transceiver 100 using a vapor cell 12. The vapor cell 12 can comprise any or all of an E2O converter and exciter 14 that provides a modulated optical signal based on a modulated electromagnetic (RF/microwave or other frequency) signal, and an RF to optical demodulator 17 that modulates and optical signal based on a modulated electromagnetic (RF/microwave or other frequency) signal. The optical transmitter and electromagnetic signal 44 (RF/microwave or other frequency) receiver are both contained within the boundaries of the dashed line box 100 in FIG. 2.

It is understood that like reference numbers in FIG. 2 correspond to like elements in FIG. 1, which make up the transmitter portion of the optical transceiver 100. For sake of brevity a complete description of the optical transmitter portion of the transmitter will not be repeated.

In summary, the transmitter portion of the transceiver 100 operates as follows. A coupling laser 30 provides an output signal 32 that is configured in wavelength and energy to excite the electrons of the atoms in the vapor cell 12. When the coupling laser 30 signal 32 is coupled to the vapor cell 12, the electrons in the vapor cell at a certain selected wavelength or range of wavelengths corresponding to the coupling signal 32 become highly excited. The microwave exciter 20 transmits electromagnetic energy (RF/microwave or another frequency) to the vapor cell 12 via an antenna 22 (or another form of coupling device), which couples the RF/microwave energy (signal) 24 to the vapor cell 12. The electrons in the vapor cell become very sensitive to the impinging electromagnetic field 24 provided by the microwave exciter 20. In addition, if the external electromagnetic field 24 is modulated, the electrons in the vapor cell 12 respond to the amplitude variations in the impinging electromagnetic field 24. As the electrons respond to the amplitude variations in the impinging electromagnetic field, they change the transmissivity of the dark state of the vapor cell 24, thereby modulating the intensity of the probe laser signal 34 to vary as it transmits through the vapor cell 12, so that the probe laser signal 34 is intensity modulated with the same modulation as the modulated electromagnetic signal 24 as it passes through the vapor cell 12. Thus, the microwave modulator/exciter 20 modulates electrically the probe laser signal 34 to provide the modulated optical data 26 signal, which is to be transmitted by the transmitter portion of the optical transceiver 100.

The transceiver 100 also includes an optical Transmit/Receive (Tx/Rx) switch 46. When the transceiver is operating in the optical transmit mode, the Tx/Rx switch 46 is set to the Tx position and routes the modulated optical data signal 26 to the optical amplifier 36. The modulated probe laser signal 26 can be amplified by an optical amplifier 36 to an appropriate power level and provided as an amplified, modulated optical signal 38. Once amplified, the modulated and amplified optical signal 42 is launched into free space by the launching optics 40. Thus, aspects and embodiments of the transceiver transmit a modulated optical carrier signal 42. The optical carrier signal 42 can be amplitude modulated, frequency modulated, or phase modulated.

In summary, the receiver portion of the transceiver 100 operates as follows. According to certain embodiments, when the transceiver 100 is in receive mode, the E2O converter 12 is excited by an externally transmitted electromagnetic (RF/microwave or another frequency) signal 44 transmitted from a (distant) microwave transmitter 52, as shown in FIG. 2. The E2O converter converts the received electromagnetic signal 44 to a modulated optical signal in the same manner that the transmitted does. In particular, the coupling laser 30 provides an output signal 32 that is configured in wavelength and energy to excite the electrons of the atoms in the vapor cell 12. When the coupling laser 30 signal 32 is coupled to the vapor cell 12, the electrons in the vapor cell at a certain selected wavelength or range of wavelengths corresponding to the coupling signal 32 become highly excited. The received electromagnetic signal 44 is coupled to the vapor cell 12, for example by an RF/microwave (or other frequency) antenna (not illustrated). The electrons in the vapor cell become very sensitive to the impinging electromagnetic field 44 provided by the microwave transmitter 44. In addition, if the electromagnetic field 44 is modulated, the electrons in the vapor cell 12 respond to the amplitude variations in the impinging electromagnetic field 44. As the electrons respond to the amplitude variations in the impinging electromagnetic field, they change the transmissivity of the dark state of the vapor cell 12, thereby modulating the intensity of the probe laser signal 34 to vary as it transmits through the vapor cell 12, so that the probe laser signal 34 is intensity modulated with the same modulation as the modulated electromagnetic signal 44 as the signal 34 passes through the vapor cell 12. Thus, the microwave transmitter 44 transmitted electromagnetic signal 44 modulates the modulates the probe laser signal 34 to provide the modulated optical data 26 signal, which is to be received by the receiver portion of the optical transceiver 100.

When the transceiver is operating in the optical receive mode, The T/R switch is set to the Rx position and routes the modulated optical data signal 26 to the photo detector 48. The photodetector receiver the modulated optical data signal 26 and converts the optical signal to an electrical signal for processing by a processor (not illustrated) and data recovery.

Figure 3:
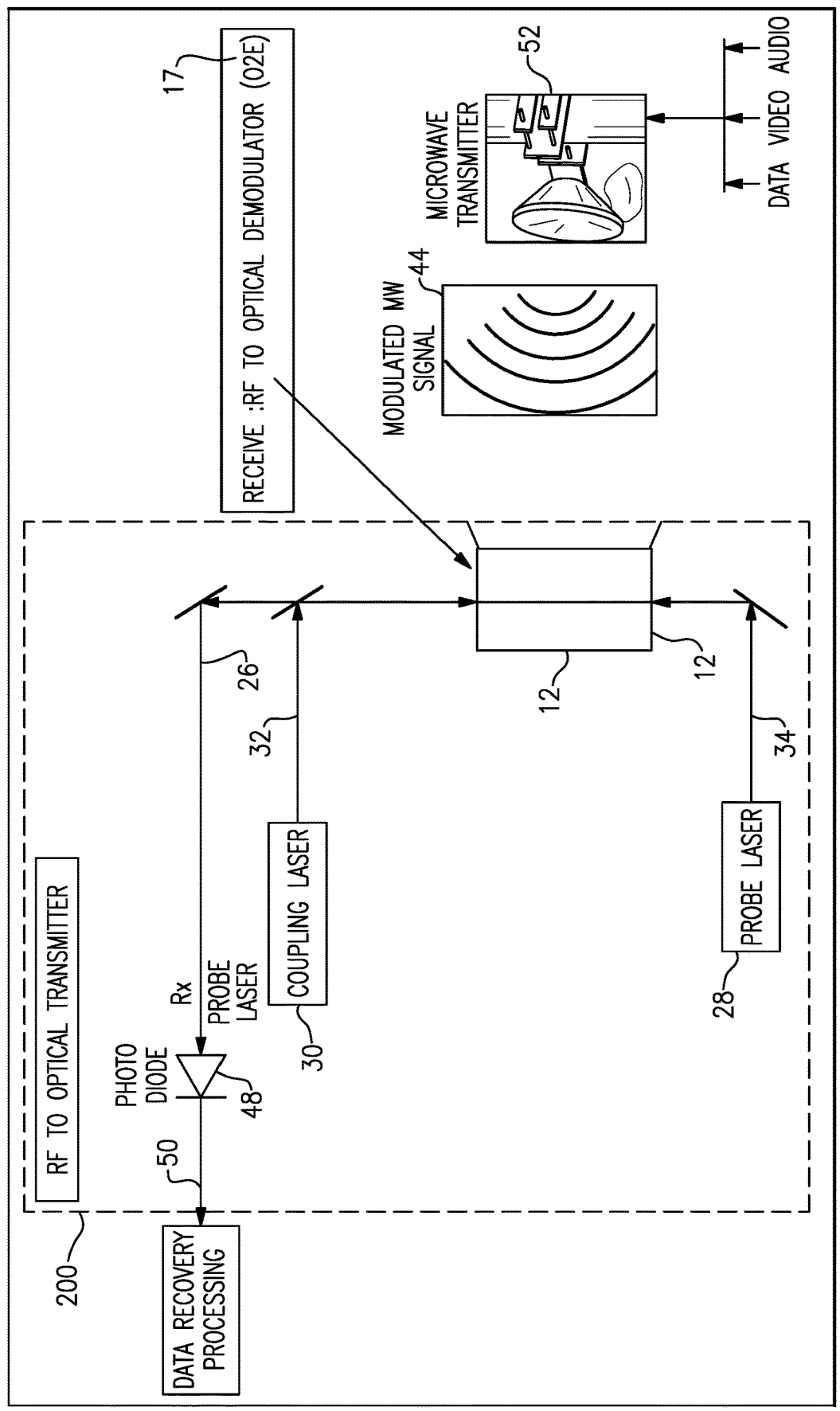
FIG. 3 illustrates one example of an electromagnetic receiver using a vapor cell as an E2O converter for receiving a modulated electromagnetic signal.

According to certain various aspects and embodiments, the vapor cell can also be used in an electromagnetic to optical receiver. FIG. 3 illustrates one example of an RF to optical receiver 200 using a vapor cell 12. The vapor cell 12 can comprise any or all of an E2O converter that provides a modulated optical signal based on a modulated electromagnetic (RF/microwave or other frequency) signal and an RF/microwave signal to optical demodulator 17 that modulates and optical signal based on a modulated electromagnetic (RF/microwave or other frequency) signal. The operation of the vapor cell 12 in the optical receiver 200 will now be described. It is understood that like reference numbers in FIG. 3 correspond to like elements in FIGS. 1 and 2.

The receiver 200 includes a coupling laser 30 that provides an output signal 32. The signal 32 is configured in wavelength and energy to excite the electrons of the atoms in the vapor cell 12. When the coupling laser 30 signal 32 is coupled to the vapor cell 12, the electrons in the vapor cell at a certain selected wavelength or range of wavelengths corresponding to the coupling signal 32 become highly excited. A microwave/RF signal provided by a remote transmitter 52 is received at the receiver 200 and coupled to the Vapor Cell 12. The excited electrons in the vapor cell become very sensitive to the impinging electromagnetic field 44. In addition, if the external electromagnetic field 44 is modulated, the electrons in the vapor cell 12 respond to the amplitude variations in the impinging electromagnetic field 44. As the electrons respond to the amplitude variations in the impinging electromagnetic field 44, they change the transmissivity of the dark state of the vapor cell 24, thereby modulating the intensity of probe laser 28 signal 34 to vary as it transmits through the vapor cell 12. The result is that the probe laser signal 34 is intensity modulated with the same modulation as the modulated electromagnetic signal 44 as it passes through the vapor cell 12. Thus, the vapor cell 12 uses the microwave/RF signal 44 transmitted by microwave transmitter 52 to modulate the probe laser signal 34 to provide an output modulated optical data 26 signal. The modulated optical data signal 26 is provided to the photo detector 48. The photodetector 48 receives the modulated optical data signal 26 and converts the optical signal to an electrical signal for processing by a processor (not illustrated) and data recovery.

Thus, in summary, the E2O converter 12 is excited by an externally transmitted signal 44 transmitted from a (distant) microwave transmitter 52. The E2O converter converts the received microwave signal 44 to a modulated optical signal. Thus, the microwave transmitter 44 transmitted electromagnetic signal 44 modulates the modulates the probe laser signal 34 to provide the modulated optical data 26 signal, which is to be received by the receiver portion of the optical transceiver 100 and processed for data recovery.

Figure 4:
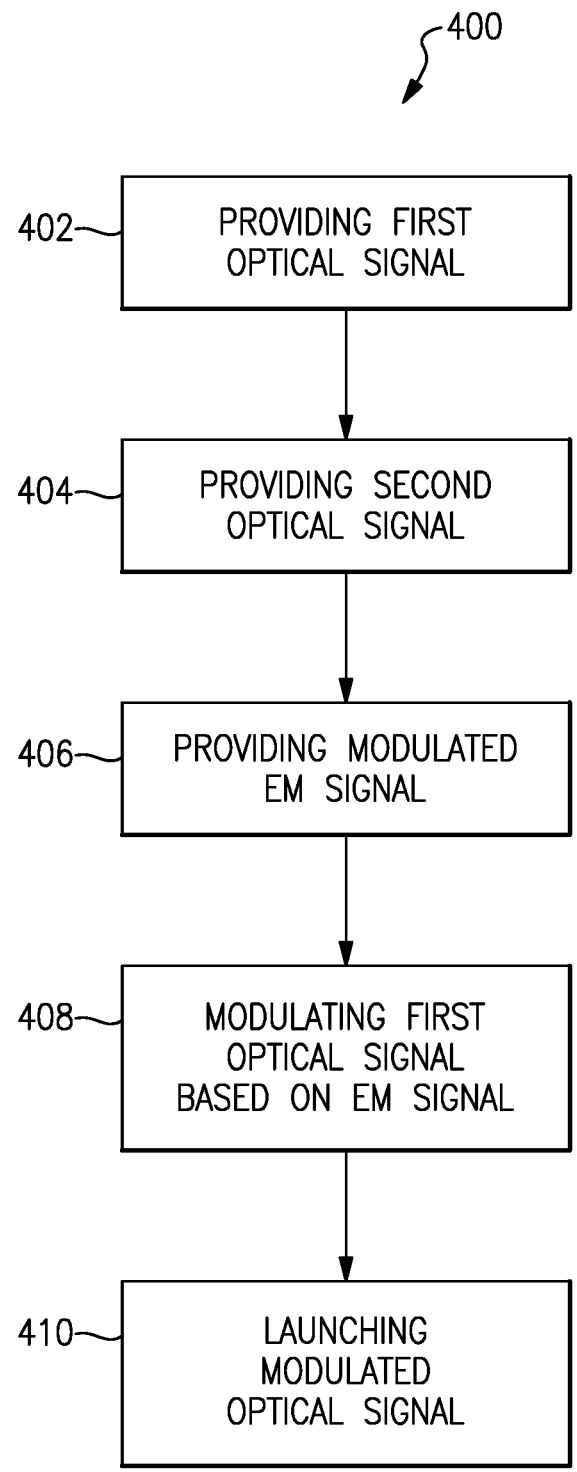
FIG. 4 illustrates one embodiment of a method of transmitting a modulated optical signal based on a modulated electromagnetic signal.

Referring now to FIG. 4, there is illustrated one embodiment of a method 400 of transmitting a modulated optical signal based on a modulated electromagnetic signal. The method comprises providing a first optical signal 402 at a first wavelength to vapor cell. The method further comprises providing a second optical signal 404 to the vapor cell at a wavelength of light to excite atoms in the vapor cell to induce electromagnetically Induced Transparency (EIT) so as to make the vapor cell transparent to the first wavelength of the first optical signal. In one example, the method comprises highly exciting electrons of the vapor cell so as to respond to modulation variations in the electromagnetic field, which results in a change of the transmissivity of the dark state of the vapor cell thereby causing an intensity of first optical signal to be modulated as it propagates through the vapor cell. The method further comprises providing a modulated electromagnetic signal 406 to the vapor cell and modulating the first optical signal 408 with the vapor cell based on the modulated electromagnetic signal. In particular, the vapor cell comprises an E2O converter that modulates the first optical signal based on the received modulated electromagnetic signal to provide a modulated output optical signal, where an intensity modulation of the modulated output optical signal is representative of a modulation of the modulated electromagnetic signal. The method further comprises launching the modulated output optical signal 410 into free space.

In one example, the method further comprises providing the vapor cell with cesium atoms.

In one example, the method further comprises modulating the modulated electromagnetic signal with any of intensity modulation (IM), frequency modulation (FM) and phase modulation (PM).

In one example, the method further comprises amplifying the modulated output optical signal to an increased power level and providing as an amplified modulated optical signal.

Figure 5:
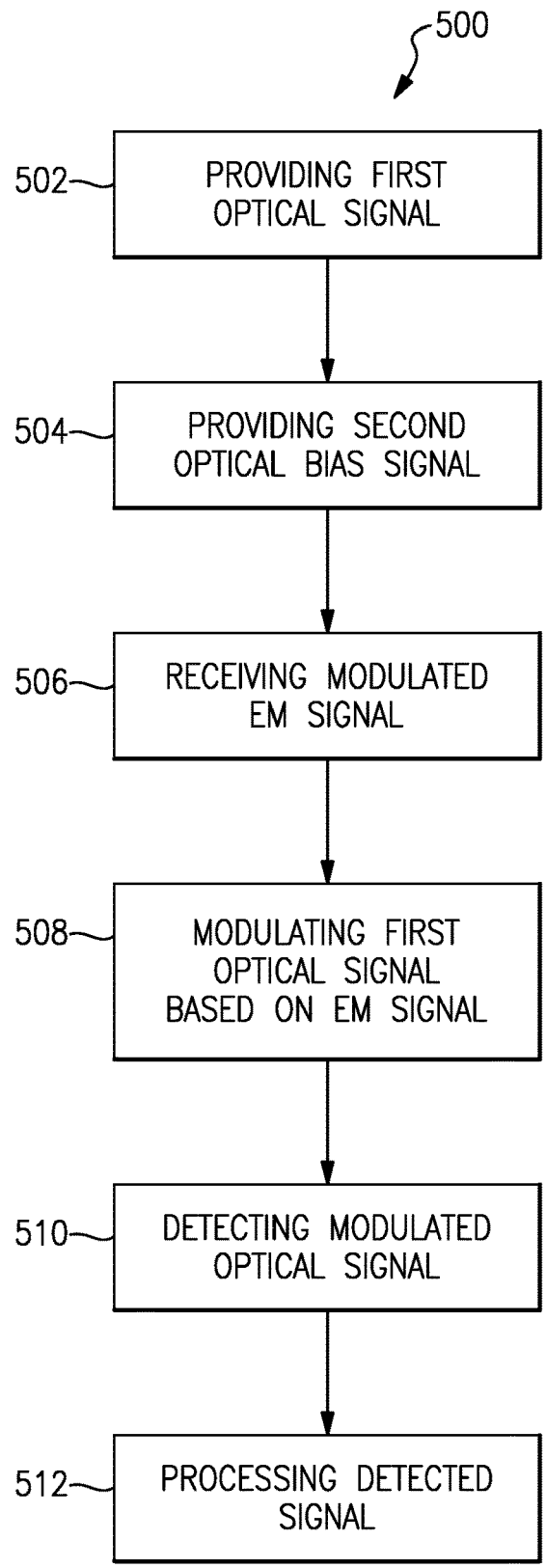
FIG. 5 illustrates one embodiment of a method of receiving a modulated electromagnetic signal and processing a modulated optical signal to determine information in the modulated electromagnetic signal.

Referring now to FIG. 5, there is illustrated one embodiment of a method 500 of receiving a modulated electromagnetic signal and processing a modulated optical signal to determine information in the modulated electromagnetic signal. The method comprises providing a first optical signal 502 at a first wavelength to a vapor cell. The method further comprises providing a second optical signal 504 to the vapor cell at a wavelength of light to excite atoms in the vapor cell to induce electromagnetically Induced Transparency (EIT) so as to make the vapor cell transparent to the first wavelength of the first optical signal. In one example, the method comprises highly exciting electrons of the vapor cell so as to respond to modulation variations in the electromagnetic field, which results in a change of the transmissivity of the dark state of the vapor cell thereby causing an intensity of first optical signal to be modulated as it propagates through the vapor cell. The method further comprises receiving a modulated electromagnetic signal 506 at the vapor cell and modulating the first optical signal 508 with the vapor cell based on the modulated electromagnetic signal. In particular, the vapor cell comprises an E2O converter that modulates the first optical signal based on the received modulated electromagnetic signal to provide a modulated output optical signal, where an intensity modulation of the modulated output optical signal is representative of a modulation of the modulated electromagnetic signal. The method further comprises detecting the modulated output optical signal 510 and processing the detected signal 512 to determine a modulation of the modulated electromagnetic signal.

In one example, the vapor cell is provided with cesium atoms.

In one example, the method further comprises detecting the modulation of the modulated electromagnetic signal with any of intensity modulation (IM), frequency modulation (FM) and phase modulation (PM).

Some advantages of the herein described embodiments and system include: that the antenna is not a function of the wavelength of the EM wave as is the case with conventional antennas; that the noise floor is at the quantum level, not the thermal level as is the case in conventional antennas; and that the system is a highly linear system.

According to various aspects and embodiments, a vapor cell is used as an optical modulator. A coupling laser establishes an energy state of Rydberg atoms of the vapor cell. In response to an RF/microwave signal, an optical carrier signal (provided by a probe laser) is modulated in the vapor cell, by modulating the transmissivity of the dark state of the vapor cell with the RF/microwave signal. As a result, a modulated optical signal is provided. The optical signal can be intensity modulated, frequency modulated, or phase modulated.

According to various aspects and embodiments, the modulated laser signal can be transmitted to free space transmission as a transmitted optical signal.

According to various aspects and embodiments, the modulated laser signal can be provided to a photodetector as a received signal for conversion and signal processing of properties of a received RF/microwave signal.

According to various aspects and embodiments, the output of the microwave exciter is modulated with data to be transmitted.

According to certain various aspects and embodiments, the transitivity of the dark state of the vapor cell is modulated by the output of the RF/microwave exciter instead of a coupling laser. With this arrangement, the RF/microwave exciter excites the electrons of the Rydberg atoms of the vapor cell.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Accordingly, the foregoing description and drawings are by way of example only, and the scope of the invention should be determined from proper construction of the appended claims, and their equivalents.

What is claimed is:

1. An optical transmitter, comprising:
   a probe optical source configured to provide a first optical signal;
   an electromagnetic source configured to provide a modulated electromagnetic signal;
   a vapor cell configured to receive the first optical signal and a first modulated electromagnetic signal from a first microwave modulator/exciter and a second modulated electromagnetic signal via free space from a remote transmitter, the vapor cell configured to modulate the first optical signal based on one of the first modulated electromagnetic signal and the received second modulated electromagnetic signal to provide a modulated output optical signal; and
   free space launching optics configured to receive the modulated output optical signal and transmit the modulated optical signal into free space.

2. The optical transmitter of claim 1, wherein the vapor cell comprises an Electrical-to-Optical (E2O) converter that converts an electromagnetic signal to an optical signal.

3. The optical transmitter of claim 1, wherein the vapor cell comprises an Optical-to-Optical (O2O) converter that performs a wavelength translation from one wavelength of a modulated optical signal impinging on the vapor cell to another wavelength.

4. The optical transmitter of claim 1, further comprising:
   a second source of a second optical signal;
   wherein the vapor cell material is opaque to a wavelength of the first optical signal, and wherein the second optical signal is provided at a wavelength of light to the vapor cell to excite atoms in the vapor cell to a high principal quantum number creating a superposition of two coupled degenerative states and a dark state that is resonant with the wavelength of the first optical signal to induce electromagnetically Induced Transparency (EIT) so as to make the vapor cell transparent to the wavelength of the first optical signal.

5. The optical transmitter of claim 4, wherein highly excited electrons of the vapor cell respond to modulation variations in an electromagnetic field, which results in a change of transmissivity of the dark state of the vapor cell thereby causing an intensity modulation of the modulated output optical signal to be representative of a modulation of the modulated electromagnetic signal.

6. The optical transmitter of claim 1, which is part of a transceiver device that further comprises an optical Transmit/Receive (T/R) switch that routes the modulated output optical signal to one of a first output and a second output, the first output of the optical T/R switch being coupled to and providing the modulated optical signal to the launching optics, the second output of the T/R switch being coupled to and providing the modulated output optical signal to an optical detector that provides a detected signal for processing.

7. A method of transmitting a modulated optical signal, comprising:
   receiving an optical probe signal;
   receiving a first modulated EM signal;
   receiving a second modulated EM signal from a remote transmitter;
   modulating the optical probe signal with a vapor cell based on one of the first modulated EM signal and the second modulated EM signal to provide a modulated output optical signal electromagnetic signal; and
   transmitting the modulated output optical signal into free space.

8. The method of claim 7, the vapor cell providing an Electrical-to-Optical (E2O) conversion.

9. The method of claim 7, the vapor cell providing an Optical-to-Optical (O2O) conversion.

10. The method of claim 7, further comprising:
    providing an optical signal to the vapor cell at a wavelength of light to excite atoms in the vapor cell to a high principal quantum number creating a superposition of two coupled degenerative states and a dark state that is resonant with a first wavelength of the optical probe signal to induce electromagnetically Induced Transparency (EIT) so as to make the vapor cell transparent to the first wavelength of the optical probe signal.

11. The method of claim 10, further comprising highly exciting electrons of the vapor cell so as to respond to modulation variations in an electromagnetic field, which results in a change of transmissivity of the dark state of the vapor cell thereby causing an intensity of the modulated optical probe signal to be representative of a modulation of one of the first modulated EM signal and the second modulated EM signal.

12. An electromagnetic optical transceiver including an optical receiver and an optical transmitter comprising:
    a probe optical source configured to provide a first optical signal;
    a vapor cell configured to receive the first optical signal and a first modulated electromagnetic signal from a first microwave modulator/exciter and a second modulated electromagnetic signal via free space from a remote transmitter, the vapor cell configured to modulate the first optical signal based on one of the first modulated electromagnetic signal and the received second modulated electromagnetic signal to provide a modulated output optical signal;
    a Transmit/Receive (T/R) switch configured to switch between providing the modulated output optical signal to launching optics of the transmitter for transmitting the modulated output optical signal from the vapor cell into free space and providing the modulated output optical signal from the vapor cell to the receiver to provide the received output optical signal to an optical detector; and
    the optical detector that receives the modulated output optical signal and provides a detected signal based on the received modulated output optical signal.

13. The electromagnetic optical transceiver of claim 12, wherein the vapor cell comprises an Electrical-to-Optical (E2O) converter that converts an electromagnetic signal to an optical signal.

14. The electromagnetic optical transceiver of claim 12, wherein the vapor cell comprises an Optical-to-Optical (O2O) converter that performs a wavelength translation from one wavelength of a modulated optical signal impinging on the vapor cell to another wavelength.

15. The electromagnetic optical transceiver of claim 12, further comprising:
    a second source of a second optical signal;
    wherein the vapor cell material is opaque to a wavelength of the first optical signal, and wherein the second optical signal is provided at a wavelength of light to the vapor cell to excite atoms in the vapor cell to a high principal quantum number creating a superposition of two coupled degenerative states and a dark state that is resonant with the wavelength of the first optical signal to induce electromagnetically Induced Transparency (EIT) so as to make the vapor cell transparent to the wavelength of the first optical signal.

16. The electromagnetic optical transceiver of claim 15, wherein highly excited electrons of the vapor cell respond to modulation variations in an electromagnetic field, which results in a change of transmissivity of the dark state of the vapor cell thereby causing an intensity of the modulated output optical signal to be representative of a modulation of the modulated electromagnetic signal.

17. A method of transmitting an optical signal and receiving a modulated electromagnetic signal, comprising:
   providing a first optical signal at a first wavelength to a vapor cell;
   receiving a first modulated electromagnetic signal at the vapor and a second modulated electromagnetic signal from a remote electromagnetic transmitter at the vapor cell; and
   modulating the first optical signal based on one of the received first modulated electromagnetic signal and the second modulated electromagnetic signal to provide a modulated output optical signal;
   controlling a Transmit/Receive (T/R) switch to transmit the modulated optical signal into free space or to provide the modulated output optical signal from the vapor cell to a detector; and
   detecting the modulated output optical signal and processing the detected signal to determine a modulation of the modulated electromagnetic signal.

18. The method of claim 17, further comprising the vapor cell providing an Electrical-to-Optical (E2O) conversion.

19. The method of claim 17, further comprising the vapor cell providing an Optical-to-Optical (O2O) conversion.

20. The method of claim 17, further comprising:
   providing a second optical signal to the vapor cell at a wavelength of light to excite atoms in the vapor cell to a high principal quantum number creating a superposition of two coupled degenerative states and a dark state that is resonant with the first wavelength to induce electromagnetically Induced Transparency (EIT) so as to make the vapor cell transparent to the first wavelength of the first optical signal.

21. The method of claim 20, further comprising highly exciting electrons of the vapor cell so as to respond to modulation variations in an electromagnetic field, which results in a change of transmissivity of the dark state of the vapor cell thereby causing an intensity modulation of the modulated output optical signal to be representative of a modulation of the modulated electromagnetic signal.

* * * * *